July 11, 1944.  W. PRICE  2,353,415
LOOM
Filed May 13, 1941   8 Sheets-Sheet 4

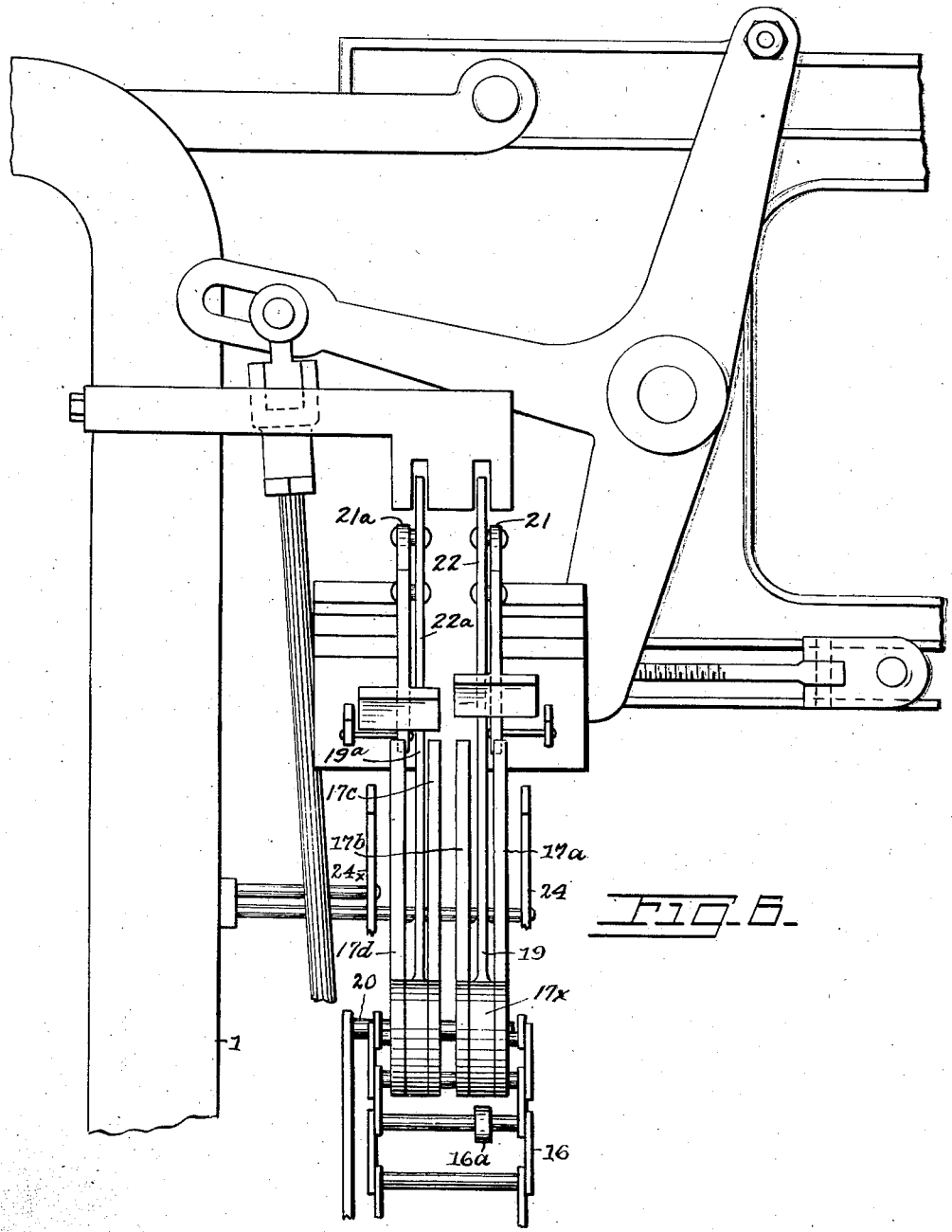

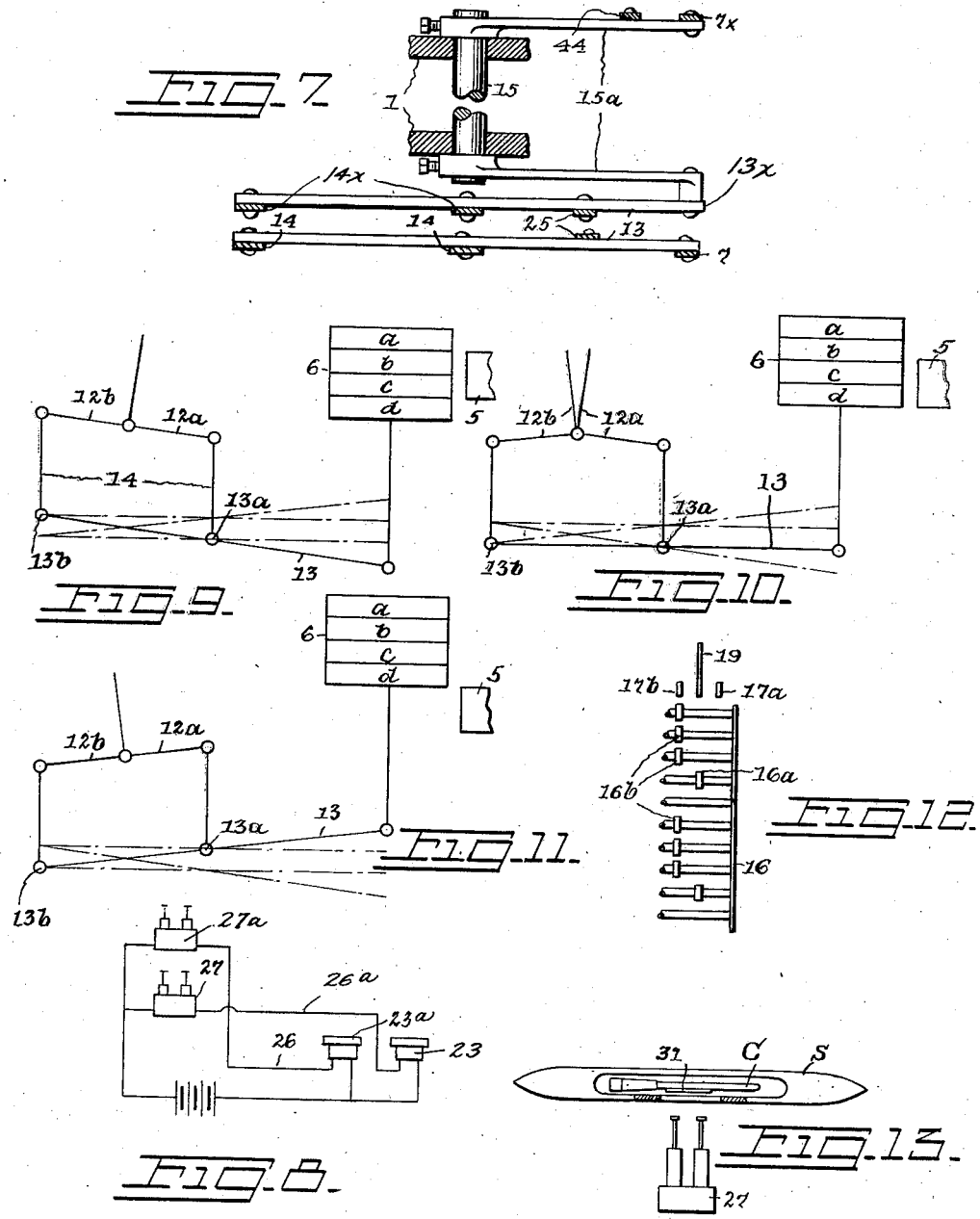

July 11, 1944.  W. PRICE  2,353,415
LOOM
Filed May 13, 1941  8 Sheets-Sheet 8
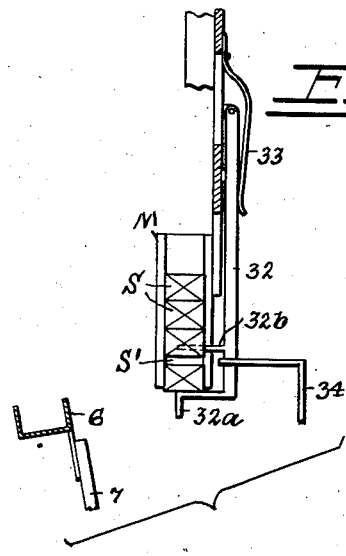
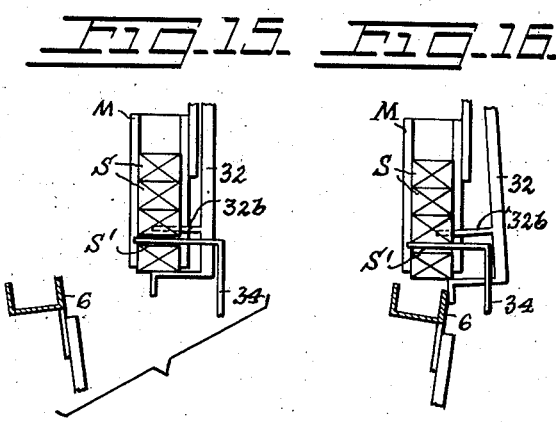
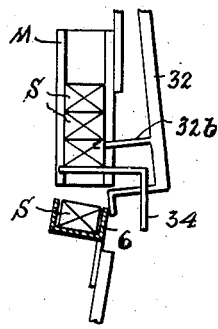
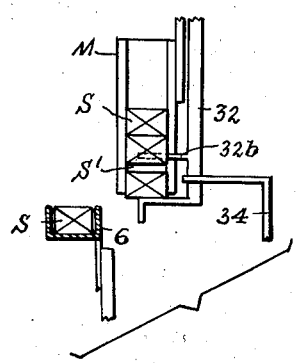
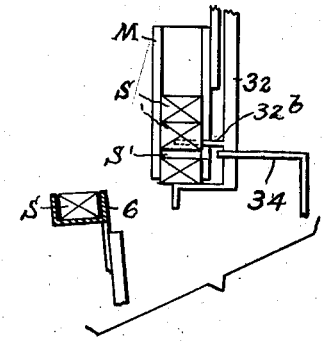
INVENTOR
Walter Price,
BY
John W. Seward.
ATTORNEY Patented July 11, 1944

2,353,415

UNITED STATES PATENT OFFICE 2,353,415

LOOM

Walter Price, Ridgewood, N. J.

Application May 13, 1941, Serial No. 393,151

10 Claims. (Cl. 139—232)

This invention relates to looms and particularly to those having a movable box-set at each side of the loom and each having at least three boxes, there being employed in the loom at least two shuttles for supplying fillings of different colors or qualities according to the pattern to be embodied in the fabric. The ultimate object is to provide, on detection of filling failure in either shuttle, for replenishment of filling without any interruption in the weaving.

Availing myself in this example of box-sets having each four boxes I aim to use for the purposes here in view only three boxes of each set, the lowest one of which serves only for discharge of a spent shuttle and the other two for reception of the shuttles in the normal or actual weaving operation, with the top one of these two also used for reception of the incoming or fresh shuttle.

To each of the two shuttles is devoted one of the box-sets in the sense that each shuttle is made always to be in that box-set at the time it is discharged and in the further sense that it is that box-set which initially receives it. In its normal or actual weaving operation each shuttle has devoted to it the topmost one of the three boxes of the box-set so devoted to it and the second or intermediate one of the three boxes of the other box-set.

According to the example the three boxes used are the first or topmost, the next or second and the fourth boxes. The third box is not used (at least in the sense that it plays a part in the invention) and hence, not brought into operative relation to or alinement with the lay. So long as there is no filling failure each shuttle, as called, passes from one to the other of the designated first and second boxes—the first of the box-set devoted to it and the second of the other box-set. But if filling failure is indicated by a shuttle then the corresponding hereinafter mentioned lever, which otherwise or normally moves to its first and second positions as the pattern requires, is caused to assume its fourth position.

There are two magazines, one at each end of the loom, and each is so constructed and its delivery so controlled that whenever the lay or batten is back, or retracted from the fell of the fabric, with the box-set adjoining such magazine elevated to its fourth position to receive the spent shuttle, it will unerringly deliver but one shuttle of its supply of several, to wit, to the first box, then above the lay.

Given a loom characterized by a four-box box-set at each side for at least two shuttles and the already indicated mechanism for shifting each box-set, it is possible by my invention to accomplish discharge of spent shuttles and incorporation of fresh shuttles in operative state without materially changing the loom or interfering with its regular weaving operation.

In the drawings,

Fig. 6 is a fragmentary rear elevation of the left-hand end of the loom, illustrating, particularly, the pattern means, controllers and master-controllers;

Fig. 7 is a plan of a certain rock-shaft and associated parts;

Fig. 8 shows one of the solenoid-including circuits;

Figs. 9, 10 and 11 are diagrams of parts of one box-set shifting mechanism in different positions;

Fig. 12 is a diagram showing so much of the chain (viewed from the back) and controllers and master-controllers as control one box-set shifting mechanism;

Fig. 13 is a plan of a circuit-closer and the corresponding shuttle, partly broken away; and Figs. 14 to 19, inclusive, are partly diagrammatic side elevations illustrating successive steps in the operation incident to delivering a shuttle from the magazine to a box-set.

Figure 3:
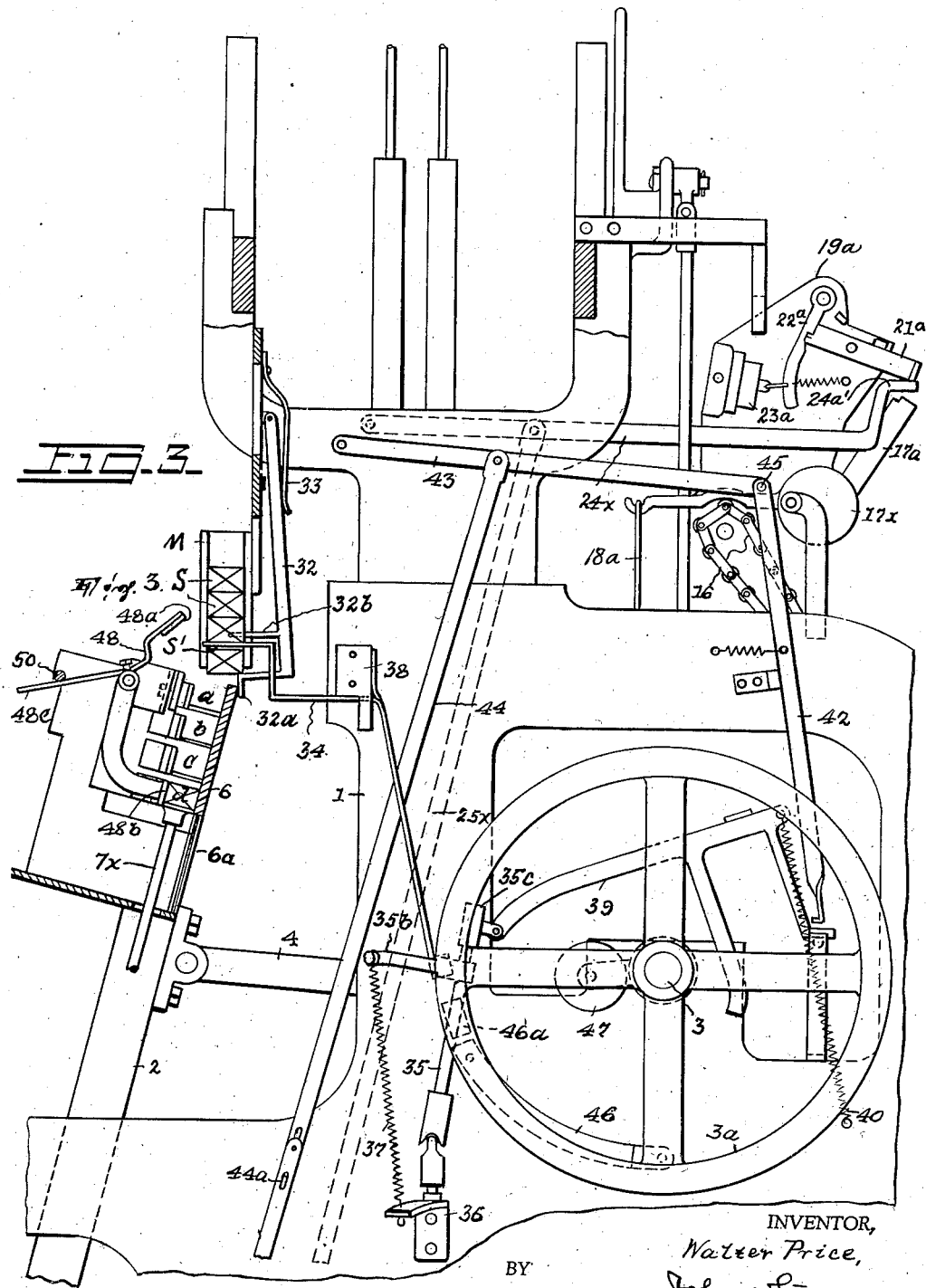
Fig. 3 is a view similar to Fig. 2 but showing parts differently positioned and some of them in section.
Figure 4:
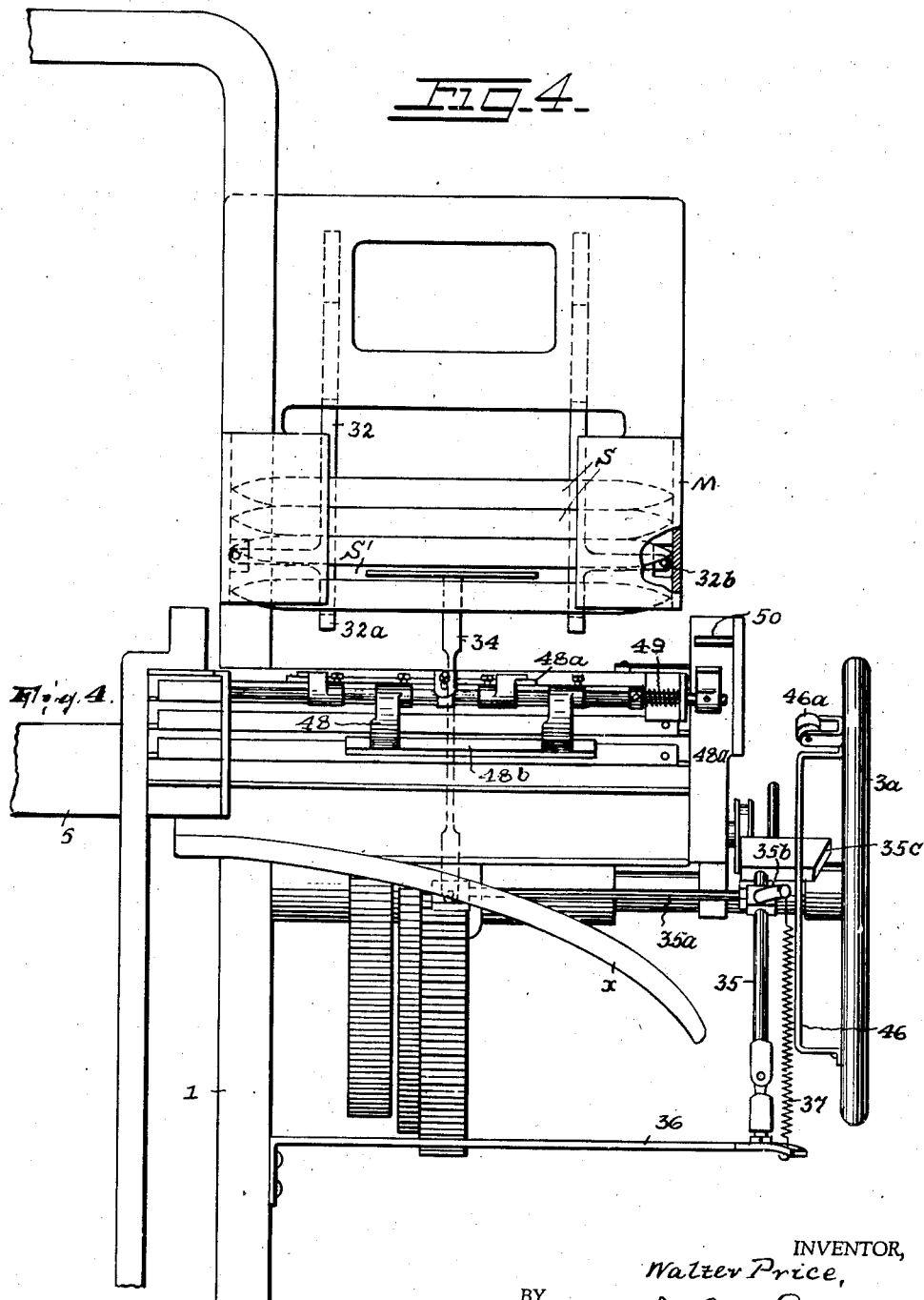
Fig. 4 is a fragmentary front elevation of the right-hand end portion of the loom, the breastbeam being omitted.
Figure 5:
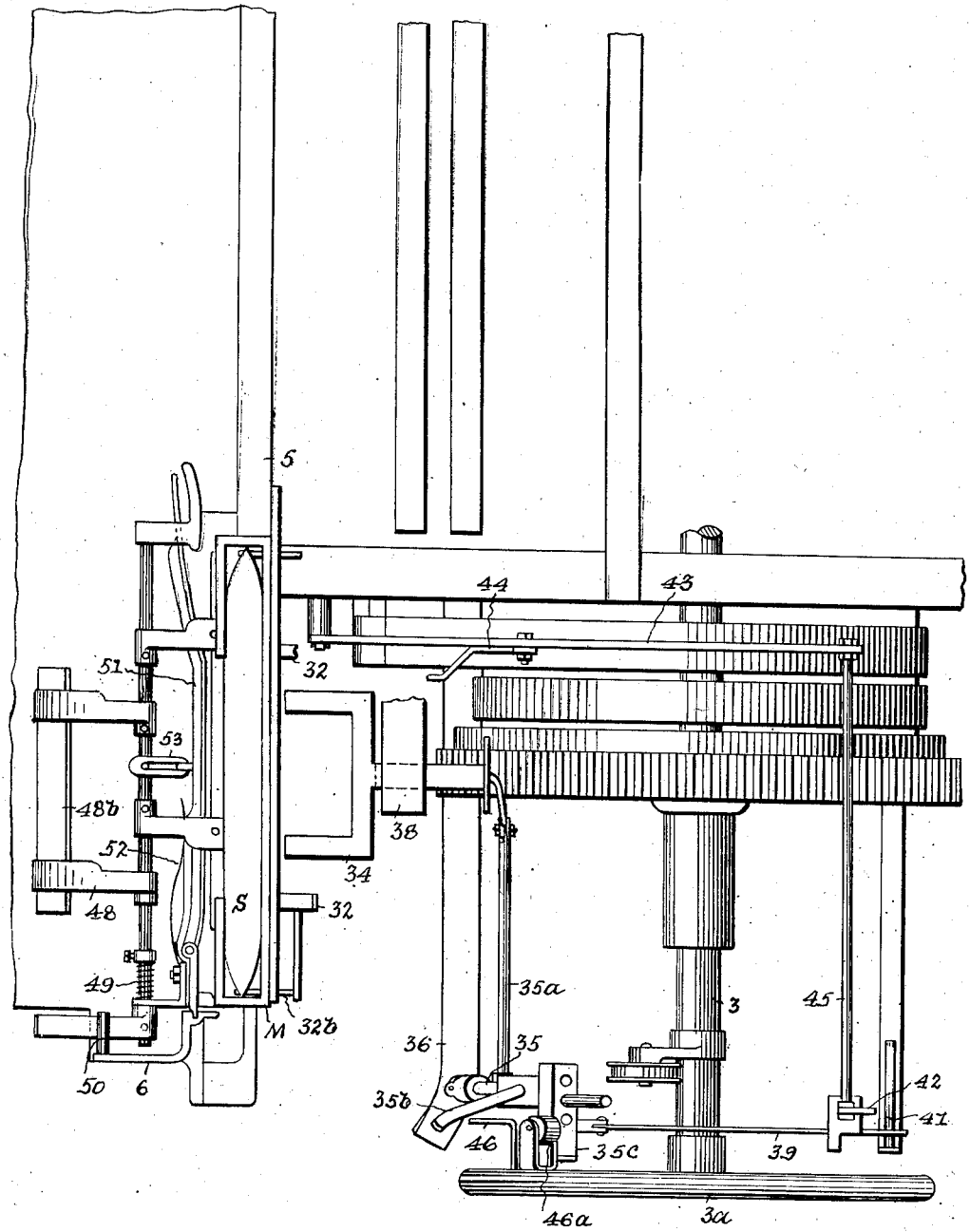
Fig. 5 is a plan of what appears in Fig. 4.

The following parts are or may be, except as will appear, the same as in a well-known type of loom: supporting structure including the frame 1 and the lay- or batten-including structure 2 pivoted at 2a; the suitably driven crank-shaft 3 and the pitmen 4 connecting its cranks (not shown) with the lay structure; the lay or batten 5 (Fig. 4) forming a part of the latter structure; and the stacks of boxes or box-sets 6 (only one being shown as viewed from the end of the loom— see Fig. 3) having depending shifting rods 7—7x, there being one such box-set (each having here four boxes) and rod, counterparts of each other, at each end of the loom, movable in a guideway, as 6a.

Figure 1:
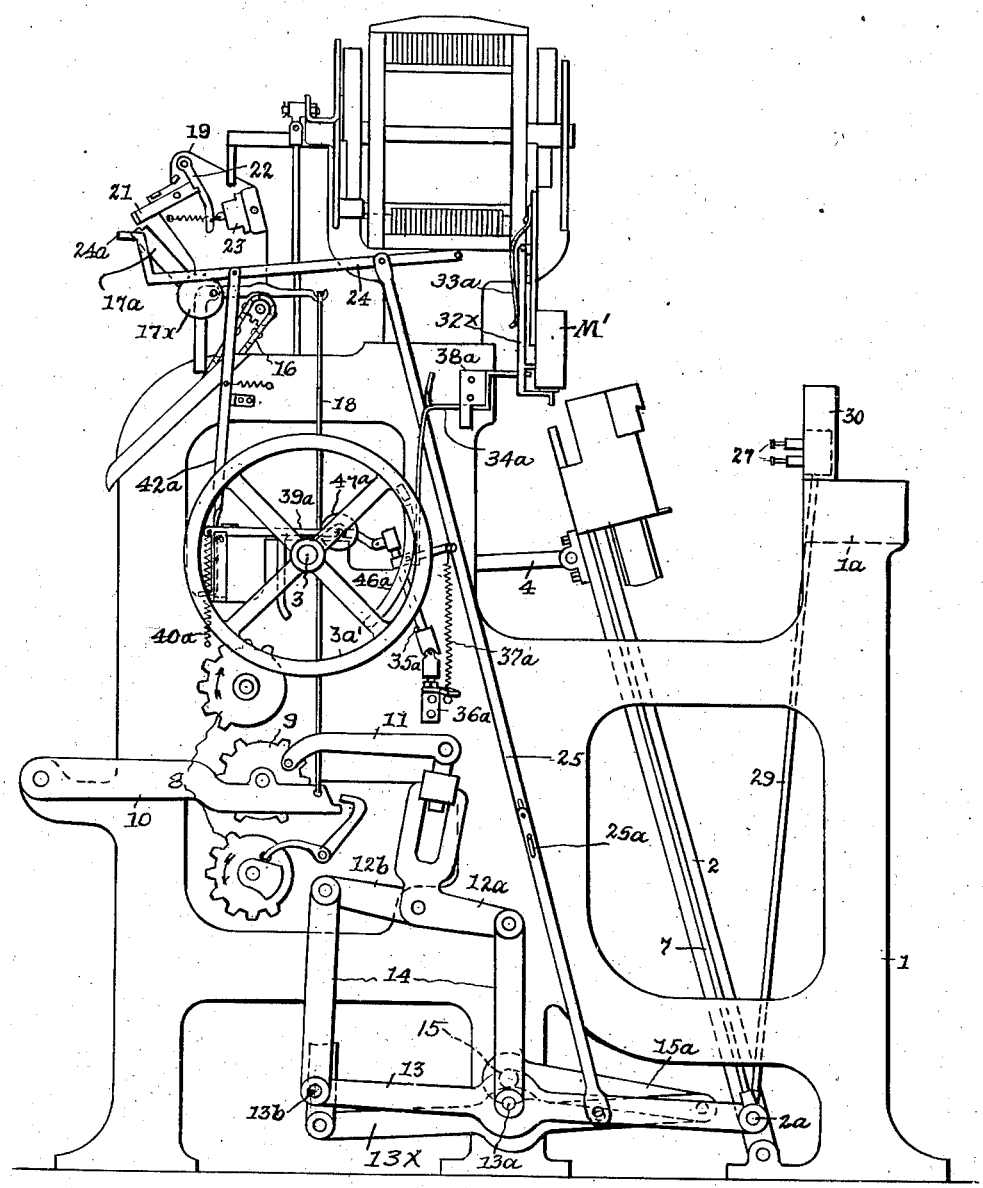
Fig. 1 is a left-hand end elevation of so much of the improved loom as is here material.

At the near end of the loom in Fig. 1 are well-known box-set shifting mechanisms each including a pair 8 of superposed mutilated cylinder gears; a pair 9 of mutilated vibrator gears (one behind the other and each engageable with either cylinder gear), each being journaled in its own vibrator lever 10; a link, as 11, connected to an eccentric point of each vibrator gear; a pair of reverse bell-crank levers 12a—12b fulcrumed in the frame and having a pair 14 (or 14x—see Fig. 7) of links connected thereto; and a floating lever. The floating lever of the near shifting mechanism is designated 13 and the other floating lever 13x. These two levers are identical and perform identical operations, lever 13 acting directly, and lever 13x indirectly, on what it controls. Thus the free or load end of lever 13 is directly connected to rod 7 at the near end of the loom and such end of lever 13x is connected to the near one of a pair 15a of cranks on a rock-shaft 15 (Fig. 7) journaled in the loom frame, the other such crank being connected to rod 7x at the other end of the loom. (For such a shifting mechanism see Patents Nos. 551,104 and 1,554,297).

In the known way the following operations occur as to either box-set: Thus, with respect to the near box-set in Fig. 1, for instance, in view of the parts 8—9 rise or fall of that vibrator lever which is connected to lever 12a means rise or fall, respectively, of the fulcrum 13a of the floating lever, and rise or fall of that vibrator lever which is connected to lever 12b means fall or rise, respectively, of the power end 13b of such floating lever.

Figure 2:
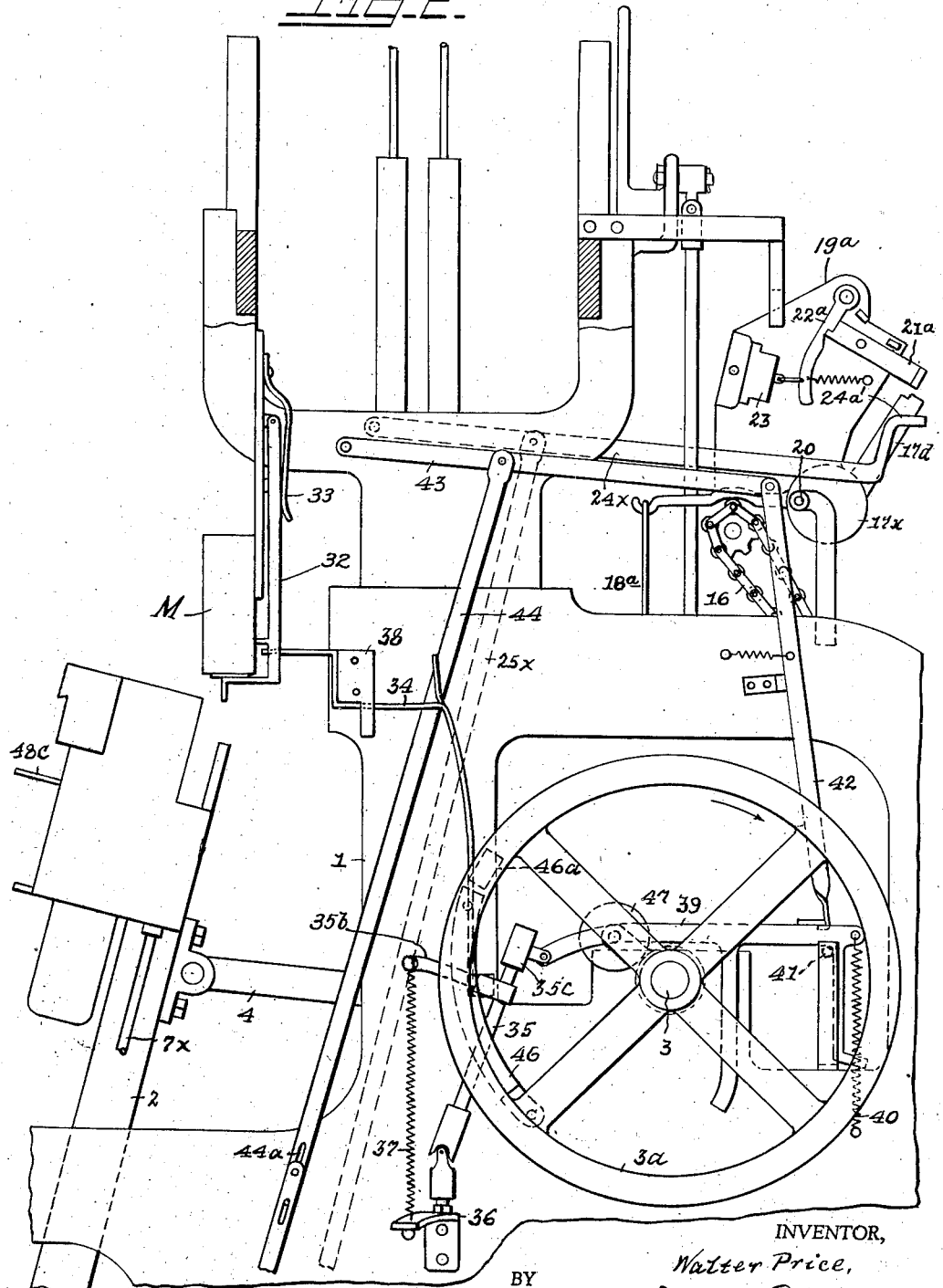
Fig. 2 is a fragmentary right-hand end elevation on a larger scale.

At the near end of the loom in Fig. 1 (see also Figs. 2, 3, 6 and 12) is a pattern chain 16 to control the positions of the two pairs of vibrator levers 10. What would usually be a single pair of rows of risers of this chain is here duplicated, the two pairs of rows being adapted to control, as will appear, the two pairs of vibrator levers 10 for the box-sets at the respective ends of the loom. There are two pairs of controllers 17a—17b and 17c—17d, the pairs 17a—17b appearing in Figs. 1, 6 and 12 and the pair 17c—17d appearing in Figs. 2, 3 and 6. Each controller is weighted at 17x. The pair 17a—17b has its members respectively connected with the vibrator levers of the near pair by links such as 18 (Fig. 1) and the pair 17c—17d has its members respectively connected with the vibrator levers of the remote pair by links such as 18a (Figs. 2 and 3). Only one-half of the chain is shown in Fig. 12, to wit, including the pair of rows of risers for controlling the box-set at the near end of the loom in Fig. 1, or an outside row 16a and an inside row 16b. The inside row 16b actuates the inside controller 17b devoted to such box-set and the other such inside row actuates the other inside controller 17c. In short, since all we are so far concerned with is movement of the box-sets to the position of that shown in Fig. 9 or that shown in Fig. 10 (the power end of the lever 13—or 13x—to be moved while its fulcrum remains down), only a controller 17b or 17c and the corresponding inside rows of risers are needed. In the absence of modifying circumstances, in other words, the mechanism controlling either box-set and as so far described would move it only to bring its box a or box b in line with the lay.

But the object being (to wit, only under special conditions, or whenever filling failure occurs) to move a floating lever 13 or 13x, say 13, to the position of Fig. 11 where box d is aligned with the lay (i. e., to raise its fulcrum while the power end remains depressed), the corresponding outside row of risers 16a is used, such being in a line between the companion inside row 16b and a row of risers which (if present in accordance with the mechanism comprising the chain and controllers as usually employed) would act directly on the controller 17a or 17d. Each of these risers 16a is arranged in lateral coincidence (Fig. 12) with the first space following each riser or group of risers in the companion row 16b, for a reason to appear, and is active on a master-controller, here in the form of a plate-like lever pivoted at 20. The master-controllers for the near and remote loom ends are designated 19 (Figs. 1, 6 and 12) and 19a (Figs. 2, 3 and 6), respectively, and they respectively have pawls 21—21a pivoted thereto to engage and lift the corresponding pair (17a—17b or 17c—17d) of controllers, but they are respectively normally held retracted by spring-actuated latches 22—22a which are made retractive from the pawls by the respective solenoids 23—23a. Each solenoid is adapted to be energized, as will appear, by the closing of a circuit by the corresponding shuttle when its filling is exhausted. The operation of either box-set shifting mechanism as modified according to my invention is as follows: Consider, for instance, the near shifting mechanism. Normally, or without filling failure, the pawl of the corresponding master-controller is retracted; controller 17a (for which there are no risers directly active thereon because normally, or without filling-failure, only boxes a and b become alined with the lay) remains down so that the fulcrum of the lever 13 remains down. Therefore absence or presence of a riser or a succession thereof of the row 16b under controller 17b means the positioning of box a or box b, respectively, in line with the lay, as already described. Filling failure occurs and the solenoid is energized, releasing the pawl of the master-controller so that said pawl falls and catches the two controllers. Now, the next time box a would otherwise be alined with the lay to receive a shuttle the master-controller will be lifted by the riser in the row 16a which laterally adjoins that space and so, through the pawl, it lifts both controllers—controller 17a to lift the fulcrum of lever 13 and controller 17b to depress the power end of said lever. Thus the box-set is brought to the position (Fig. 11) in which box d is alined with the lay.

In general, each shuttle is picked, as called by the corresponding row of risers 16b of the chain, back and forth from one to the other of the boxes a and b devoted to it, i. e., box a of the box-set devoted to it and box b of the other box-set. If, due to depletion of its filling, it closes its solenoid circuit then the next time (sooner or later) it would otherwise enter the box a devoted to it the corresponding box-set will have been so shifted in the way described that box d of that box-set will be alined with the lay and so receive the shuttle, which may fall from the loom as an incident of the motion of the lay, via such a chute as x, Fig. 4, box d being without a back.

The rise of a box-set to its maximum elevation (box d alined with the lay) must be followed by restoration of the master-controller to idle state so that such box-set may be operated in the normal way. There being two such master-controllers, one for each box-set shifting mechanism, there are therefore two levers 24—24x for unshipping the respective pawls 21—21a out of engagement with the master-controllers, they being connected with the respective floating levers 13—13x by links 25—25x. On rise of a box-set to its maximum position an abutment 24a or 24a' on the corresponding lever 24—24x lifts the corresponding pawl into idle state—caught by its latch. Each link is in fact two links connected together by a slot-and-pin connection 25a (Fig. 1), whereby in the motions of the corresponding floating lever to the positions of Figs. 9 and 10 lever 24 or 24x will not be moved though it will be when the floating lever assumes the position of Fig. 11.

There are two circuits 26—26a as shown in Fig. 8, one for each solenoid 23—23a and each including a circuit-closer 27 or 27a. These two circuit-closers are here both placed at the same side of the loom (though one may be at one side and the other at the other side) and they are positioned opposite the box-set at such side and one above the other so as to be respectively opposite the boxes a and b of such box-set—in other words, so as to be coactive the upper one with the shuttle to which such box a is devoted and the lower one with the other shuttle. So as to be always respectively opposite those boxes they are connected by a link 29 (only one being shown—Fig. 1) with the adjoining floating lever and movable up and down in a guide 30 on the breast-beam 1a of the loom frame. Each circuit-closer is adapted, when the filling in the shuttle S to which it is assigned is sufficiently depleted, to engage a metal contact 31 on the filling quill or core C of the shuttle, normally covered by such filling. The circuit-closers might be arranged at each side of the loom and each opposite a box a or box b or one opposite box a and the other opposite box b, where, as here, both are at one side.

In any event, whenever the filling of a shuttle is so depleted that, on the shuttle entering the box opposite which is the circuit-closer coactive therewith, the circuit is closed and the corresponding solenoid energized, the master-controller controlled by such solenoid will be released as described. Then whenever (sooner or later) that shuttle would otherwise next enter the box a of the box-set devoted to it the corresponding riser 16a on the chain will have caused said box-set in the manner set forth to move to place box d of the box-set in line with the lay for discharge of such shuttle.

Given a group (or box-set) of at least three superposed shuttle-boxes at, say, the near end of the lay movable to position any one of such boxes in line with the lay, the parts 7, 13, 14, 12a, 12b, 11—11, 9—9 and 10—10 form what I term a group-shifting system settable to three different states in which said system is operative (to wit, when activated, as here by the means 8) to shift said group to said three positions, respectively: that is to say, the state in which the remote parts 9—10—11 have been raised, while the corresponding near parts remain unmoved, so that when part 9 is turned anti-clockwise (as by the upper gear 8) said system will depress the power end of lever 13 and shift the group to the position of Fig. 10; the state in which said remote parts have been depressed, while the corresponding near parts remain unmoved, so that when part 9 is turned clockwise (as by the lower gear 8) said system will raise said power end and shift the group to the position of Fig. 9; and the state in which the near parts 9—10—11 have been raised so that when parts 9 are turned anti-clockwise (by upper gear 8) said system will shift the group to the position of Fig. 11. In accordance with my invention said system is preferably positively active in the sense that in whatever state it is set it will, when and by whatever medium activated, positively move the box-set or group, whether up or down, which of course is true of the system shown. Such system being thus settable to said three positions, there is means, here pattern-controlled, for setting it to two of said positions (as in Figs. 9 and 10), which is here afforded by the remote controller 17b, its link 18 and the risers 16b of chain 16, and there is filling-controlled means for causing said system to be set to the third position (as in Fig. 11), which is here afforded by the other controller, its link, the master-controller 19 and the risers 16a for intermittently raising it, the pawl or latch by which 17a—17b are coupled with 19, the circuit containing the solenoid, and the circuit-closer 31 in the shuttle.

Considering, now, the mechanism for supplying a fresh shuttle to box a of either box-set when an exhausted shuttle is discharged via box d but having reference, first, to Figs. 2 to 5, the construction in Fig. 1 being all the same except as will be noted:

There is a magazine M supported by the frame 1 and adapted to receive a stack of fresh shuttles. To the rear side of the magazine, which is open at the bottom, is pivoted a pair 32 of strips which, though independently movable, I term a stack-support, they having their lower ends bent off to extend under the magazine, being normally so held by springs 33. The pair of strips has a pair 32a of depending lugs in the path of the elevated box-set as it moves back with the lay from the beating up position of the lay, said stack-support formed by them being thus movable out of supporting relation to the stack. The bent-off ends of the strips underlie the body of the lowest shuttle. Pins or projections 32b on the stack-support are engageable under the tapering points of the next lowest shuttle (Fig. 4), being arranged at such an elevation as to support that shuttle somewhat spaced from the lowest shuttle, as at S'. The sequence of operations involving delivery of the lowest shuttle to the box a of the box-set will be particularly described hereinafter, but meanwhile let it generally be noted that the stack-support is to withdraw to permit the lowest shuttle in the magazine to fall, but only after the forked upper end of an auxiliary support 34 enters the mentioned space S' between the shuttles to support those thereabove when the stack-support withdraws and also exert sudden downward pressure on the lowest shuttle to insure its entrance to box a, when the lay, having beaten-up, at once returns. As for the means for causing the auxiliary support to move to enter said space, then move downwardly, forwardly and then up to its starting point or normally fixed position the construction is as follows (still referring to Figs. 2 to 5).

Said auxiliary support upstands from and is pivoted to the inwardly projecting arm 35a (Fig. 4) of a lever 35 universally pivoted on a bracket 36 and having a forwardly and somewhat outwardly projecting arm 35b which is connected to the bracket by a spring 37. The axis of movement of the auxiliary support extends fore and aft (Fig. 4), its upper or forked end being kept from displacement toward or from the observer in Figs. 2 and 3 by a suitable guide 38. Normally a detent 39, pivoted to lever 35 to move in a vertical plane, is held depressed by a spring 40 and so caught on a fixed stud 41, thus holding the auxiliary support retracted. If the detent be disengaged from the stud the lever will swing to the left in Figs. 2 and 3 and the forked end of the auxiliary support 34 will enter the space S'. The lifting of the detent 39 clear of the stud 41 is effected by a hook 42 which is connected to a lever 43 itself connected by a link 44 with the far crank 15a in Fig. 7, and this lever has a rigid horizontal rod 45 (Figs. 2, 3 and 5) with which such hook is connected, such link having lost-motion at 44a the same and for the same purpose as link 25. (The hook 42a—Fig. 1—corresponding to hook 42 may be connected to the adjoining one of the levers 24—24x, which are substantially vertically coincident with levers 13—13x; since hook 42 is at the far end of the loom and hence remote from levers 24—24x resort to the system of parts 43, 44 and 45 is in that case necessary.)

When the detent 39 is unshipped and lever 35 shifts to the left in Fig. 2 to project the upper end of the auxiliary support 34 into the space S' (Fig. 3) the lever 35 is to be canted from the observer to pull down element 34. For this purpose lever 35 has a shoe 35c which comes into the path of a cam 46 on the hand-wheel 3a of crankshaft 3, the leading end portion of the cam being preferably a roller 46a journaled on the hand-wheel; by this said element 34 insures that the shuttle beneath it will be quickly seated in box a. Then the element 34 is to be retracted, for which purpose there is a roller 47 on the hand-wheel arranged in the vertical plane now occupied by the detent—displaced from the observer as stated. The roller engages the detent 39 and retracts it into reengagement with stud 41, which retracts element 34, the detent then sliding along the stud 41 toward the observer under the pull of the springs which causes arm 35a of lever 35 to elevate 34 and leave the parts re-set, with the detent out of the plane of the roller.

(In Fig. 1 certain of the aforesaid elements as M, 32, 33, 34, 35, 36, 37, 38, 39. 40, 42, 46, 3a and 47 have their counterparts designatesd M', 32x, 33a, 34a, 35a, 36a, 37a, 38a, 39a, 40a, 42a, 46a, 3a' and 47a, respectively.

The top of box a of either box-set is normally closed, but must be open when box a is to receive a shuttle from the magazine, the box-set being then elevated with the lay in forward or beating-up position. With the box-set approaching that position box d may well be closed at the front so as to avoid the entering shuttle skewing out of the box in its flight, though it should be open to permit the shuttle, by its inertia, to fall from the box when the lay moves back and returns. Hence 48 is a gate or closure pivoted to the box-set 6 and having strips 48a and 48b to close boxes a and d, respectively, and an arm 48c and normally urged to close box a by a spring 49 but adapted to be moved in the opposite direction, when the box-set rises, by a stud 50 on the guideway 6a.

Fig. 14 shows the box-set forward, the stack-support supporting at 32a and 32b the lowest and next lowest shuttles in the magazine, the auxiliary support or element 34 retracted. Fig. 15 shows said element entered to the space S', element 32 unchanged as to position and the box-set somewhat back, the entering movement of said element 34 having been caused by release of the detent 39. Fig. 16 shows the box-set repressing element 32, having caused pins 32b to free the shuttles above space S'. Fig. 17 shows element 32 fully repressed, freeing the lowest shuttle, and element 34 depressed, it having quickly impelled such shuttle down into the box (while the lay was in the back part of its cycle) under the action of cam 46. In Fig. 18 the box-set has started forward, element 32 has assumed supporting relation to the tips of what is now the next lowest shuttle and also supports the now lowest shuttle, which has fallen due to the retraction of element 34, space S' being now between these two shuttles. Fig. 19 is the same as Fig. 18 excepting that element 34 has risen after being retracted, ready to enter said space when the cycle of motions is to be repeated.

In this art I believe it to be new, given supporting means, going means including a back-and-forth-moving lay, a shuttle movable across the lay, and a stack (as 6) of at least two shuttle-boxes at one end of the lay movable back and forth therewith and substantially vertically therein to position either box in line with the lay, to provide in combination with the foregoing a pattern-actuable system (here afforded by the box-set shifting mechanism and the controller 17c operatively connected therewith as described) for moving the stack down and up to position the upper and lower boxes alternately in line with the lay, a magazine (as M) for discharging the lower one of at least two superposed shuttles to the upper box when the stack is substantially back and in its upper position, movable means (as 32) for normally supporting the latter shuttles, said shuttle-supporting means being movable to release the superposed shuttles by and following upward movement of the stack, and means (as 34), controlled from said system, for supporting the upper shuttle when said shuttle-supporting means releases the two shuttles.

Given said supporting means, going means, shuttle movable across the lay, stack of at least two shuttle-boxes and pattern-actuable system, all characterized and operating as last above set forth, I believe it also to be new to provide a magazine for discharging a shuttle to the upper box when the stack is substantially back and in its upper position and means (as 34) controlled from said system, to eject a shuttle in the magazine therefrom and into said upper box when the stack is substantially back and in its upper position.

To dispense the shuttles definitely one by one from the magazine by the means shown, for example, in Figs. 14 to 19, these conditions are essential: The superposed shuttles should exist in squared relation to each other, or with their terminals on either hand in substantially vertical registry; the shuttles should have substantially equal thickness and each substantially axial tapering points or terminals. What I term the "rest," or bent-off lower end, of what I term the "primary" support, as 32, and the spaced portions 32b of such support should together support the lowest and next lowest shuttle with a space (S') between them not exceeding said thickness. And what I term the "secondary" support, as 34, should be depressed to an extent not substantially exceeding said thickness. In particular, the said space is necessary to permit the secondary support to enter between shuttles; and the specified extent of depression of the secondary support is necessary to bring the space between the terminals of the second and third from the bottom of the initial complement of shuttles opposite the portions 32b of the primary support when (Fig. 17) the latter is to resume shuttle-supporting relation.

Of course there is the usual shuttle-binder for each box *a, b* and *c* of the box-set or stack, only one, as 51, with its spring 52, being shown (Fig. 5), to wit, the one for box *a*. When the box-set rises to receive from the magazine a shuttle in box *a* said binder should be retracted to permit the shuttle to enter. For this purpose the closure 48 is intercoupled to the binder by a link 53 whereby, when the closure moves to uncover the top of the box, it retracts the binder.

Having thus fully described my invention, what I claim is:

1. The combination, with supporting structure including a lay, a shuttle movable across the lay, and a group of at least three superposed shuttle-boxes at one end of the lay movable substantially vertically to three different positions which will aline the boxes, respectively, with the lay, a group-shifting system supported by said structure and operatively connected with said group and settable to three different states in which it is operative to transmit motion for shifting said group to said three different positions, respectively, means for setting said system in one and then the other of two such states, and means, controlled by the filling in the shuttle, coactive with the first-named means to set said system in the third state.

2. The combination, with supporting structure, going means including a back-and-forth-moving lay, a shuttle movable across the lay, and a group of at least two superposed shuttle-boxes at one end of the lay movable back and forth therewith and substantially vertically therein to position either box in line with the lay, of a system for moving the group down and up to position the upper and lower of said boxes alternately in line with the lay, a magazine, supported by said structure, for discharging the lower one of at least two superposed shuttles to the upper box when the group is substantially fully back and in its upper position, movable means for normally supporting the latter shuttles, said shuttle-supporting means being movable by the group to release the superposed shuttles following upward and on backward movement of such group, and means, controlled from said system, for supporting the upper shuttle when said shuttle-supporting means releases the two shuttles.

3. The combination set forth in claim 1 characterized by the last-named means being formed and arranged to be entered between said two shuttles to support the upper one when the shuttle-supporting means releases said shuttles.

4. The combination set forth in claim 1 characterized by the shuttle-supporting means normally supporting the superposed shuttles in spaced relation to each other and by the means last set forth in said claim being formed and arranged to be entered between said shuttles.

5. The combination set forth in claim 1 characterized by the last-named means being downwardly movable to eject the lower one of said shuttles.

6. The combination, with supporting means, going means including a back-and-forth-moving lay, a shuttle movable across the lay, and a group of at least two superposed shuttle-boxes at one end of the lay movable back and forth therewith and substantially vertically therein to position either box in line with the lay, of a pattern-actuable system for moving the group down and up to position the upper and lower boxes alternately in line with the lay, a magazine for discharging a shuttle to the upper box when the group is substantially fully back and in its upper position, and means, controlled from said system, to eject a shuttle in the magazine therefrom and into said upper box when the stack is substantially fully back and in its upper position.

7. The combination, with supporting structure, going means including a back-and-forth-moving lay, a shuttle movable across the lay, and a group of at least two superposed shuttle-boxes at one end of the lay movable back and forth therewith and substantially vertically therein to position either box in line with the lay, of a pattern-actuable system for moving said group down and up to position the upper and lower of said boxes alternately in line with the lay, a magazine for at least two superposed shuttles arranged to deliver a shuttle to the upper box when the lay is approximately fully back and said group has been elevated to position the lower of said boxes in line with the lay, supporting means for such two shuttles normally maintaining them with a space between them, shuttle-impelling means enterable to said space and thereupon movable downwardly to impel the lower shuttle downwardly, and means, controlled from said system, to enter the impelling means to said space, then retract said supporting means to free said two shuttles, and then move downwardly the impelling means when the upper one of said boxes is in receiving relation to the magazine.

8. In combination, a magazine to receive and confine in substantially squared relation superposed shuttles having substantially equal thickness and each having substantially axial tapering terminals, a movable primary support for the shuttles having a rest normally underlying the body of the lowest shuttle and spaced portions normally entered between the terminals of said lowest and the next lowest shuttles but arranged to support the latter shuttle spaced from the former a distance not exceeding said thickness, a secondary support normally positioned out of supporting relation to the shuttles but enterable to the space between said lowest and next lowest shuttles, and means first to enter the secondary support into said space and then retract the primary support from supporting relation to the shuttles, whereby to permit the lowest shuttle to fall, then depress the secondary support to an extent not substantially exceeding said thickness, and finally return said supports to their initial positions.

9. The combination, with supporting structure, going means including a back-and-forth-moving lay, a shuttle-box thereon having an open top, a shuttle-binder normally urged into binding relation to a shuttle present in the box, a closure normally in covering relation to but movable to clear the top of the box, a magazine to deliver a shuttle to the box when the lay is in a given position, said binder and closure being intercoupled to move out of their said relations, and means, when the lay approaches said position, to move one of the parts formed by the intercoupled binder and closure out of its normal relation.

10. The combination, with supporting structure including a lay, a shuttle movable across the lay, and a group of at least three superposed shuttle-boxes at one end of the lay movable substantially vertically, of a floating lever movable in an upright plane and supporting at its free end said group, lever-moving means supported in said structure and engaged with the lever power end, lever-moving means supported in said structure and engaged with the lever fulcrum, the first-named means being independently settable to two different states in which it is operative for transmitting motion for canting said lever in the upward or downward direction and the second-named means being movable upwardly to raise the lever fulcrum, means for setting the first-named lever-moving means in either of its two set states, and means controlled by the filling in the shuttle and coactive with the third-named means for moving the second-named lever-moving means upwardly.

WALTER PRICE.